United States Patent
McDonald et al.

(10) Patent No.: US 12,141,289 B1
(45) Date of Patent: Nov. 12, 2024

(54) REAL TIME APPLICATION PROTECTION SYSTEM CONFIGURATION DEFICIENCY PREDICTION

(71) Applicant: Wells Fargo Bank, N.A., San Francisco, CA (US)

(72) Inventors: Matthew Thomas McDonald, Callahan, FL (US); Jeremy W. Long, Herndon, VA (US); Mitch Moon, Plymouth, MN (US); Isaiah Adonu, Oro Valley, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 457 days.

(21) Appl. No.: 17/122,734

(22) Filed: Dec. 15, 2020

Related U.S. Application Data

(60) Provisional application No. 62/972,280, filed on Feb. 10, 2020.

(51) Int. Cl.
*G06F 21/57* (2013.01)
*G06N 20/00* (2019.01)

(52) U.S. Cl.
CPC ............ *G06F 21/577* (2013.01); *G06N 20/00* (2019.01); *G06F 2221/033* (2013.01)

(58) Field of Classification Search
CPC .. G06F 21/577; G06F 2221/033; G06N 20/00
See application file for complete search history.

(56) References Cited

U.S. PATENT DOCUMENTS

| | | | |
|---|---|---|---|
| 7,797,540 B2 | 9/2010 | Conley et al. | |
| 8,789,187 B1 * | 7/2014 | Pennington | G06F 11/3688 726/25 |
| 8,843,915 B2 | 9/2014 | Liverance | |
| 10,114,954 B1 * | 10/2018 | Bellis | G06F 21/577 |
| 10,326,672 B2 | 6/2019 | Scheib et al. | |

(Continued)

OTHER PUBLICATIONS

U.S. Appl. No. 17/122,635, filed Dec. 15, 2020, naming inventors McDonald et al.

(Continued)

*Primary Examiner* — Shin-Hon (Eric) Chen
*Assistant Examiner* — Thomas A Carnes
(74) *Attorney, Agent, or Firm* — Kilpatrick Townsend & Stockton LLP

(57) ABSTRACT

Techniques are described for improving real-time application protection (RTAP) systems (e.g., web application firewalls (WAFs), runtime application self-protection (RASP) systems). In particular, a device within a trusted network may configured to predict vulnerabilities of proposed configurations for the RTAP systems. For example, the device may train one or more machine learning models with a first plurality of configuration settings of application protection systems corresponding to a plurality of applications and a first plurality of known vulnerabilities corresponding the first plurality of configuration settings; apply the one or more machine learning models to a proposed configuration setting to predict one or more potential vulnerabilities of the proposed configuration setting; and identify one or more configuration changes to the proposed configuration setting to overcome the predicted one or more potential vulnerabilities.

17 Claims, 3 Drawing Sheets

(56) References Cited

U.S. PATENT DOCUMENTS

| | | | |
|---|---|---|---|
| 10,341,377 B1 | 7/2019 | Dell'Amico et al. | |
| 10,558,809 B1* | 2/2020 | Joyce | G06N 5/046 |
| 10,630,468 B1* | 4/2020 | Wang | G06N 20/00 |
| 10,650,150 B1* | 5/2020 | Rajasooriya | G06N 7/01 |
| 11,115,272 B1 | 9/2021 | Kumar et al. | |
| 11,503,075 B1 | 11/2022 | Sirianni | |
| 2003/0176931 A1* | 9/2003 | Pednault | G06N 7/01 700/44 |
| 2005/0039047 A1 | 2/2005 | Raikar et al. | |
| 2005/0177746 A1 | 8/2005 | Bunn et al. | |
| 2006/0253906 A1 | 11/2006 | Rubin et al. | |
| 2009/0293126 A1 | 11/2009 | Archer et al. | |
| 2010/0057478 A1 | 3/2010 | Hamilton, II et al. | |
| 2011/0321164 A1* | 12/2011 | Saxena | G06F 21/577 726/25 |
| 2012/0278892 A1 | 11/2012 | Turbin | |
| 2015/0106939 A1* | 4/2015 | Lietz | H04L 63/1433 726/25 |
| 2015/0213272 A1 | 7/2015 | Shezaf et al. | |
| 2015/0271193 A1 | 9/2015 | Estes et al. | |
| 2017/0034023 A1* | 2/2017 | Nickolov | H04L 43/0817 |
| 2017/0061133 A1* | 3/2017 | Trabelsi | G06F 16/951 |
| 2017/0318034 A1 | 11/2017 | Holland et al. | |
| 2018/0124098 A1* | 5/2018 | Carver | G06N 20/00 |
| 2018/0218171 A1* | 8/2018 | Bellala | G06N 20/00 |
| 2018/0278649 A1 | 9/2018 | Thomas et al. | |
| 2019/0114435 A1* | 4/2019 | Bhalla | G06F 21/55 |
| 2019/0196935 A1* | 6/2019 | Edwards | G06Q 20/3223 |
| 2019/0197243 A1* | 6/2019 | Hendrickx | G06F 16/148 |
| 2019/0205542 A1* | 7/2019 | Kao | G06F 8/10 |
| 2019/0260804 A1* | 8/2019 | Beck | G06F 21/556 |
| 2020/0145455 A1* | 5/2020 | Nandi | G06F 21/577 |
| 2020/0210590 A1* | 7/2020 | Doyle | G06F 8/77 |
| 2020/0257539 A1* | 8/2020 | Borlick | G06N 20/00 |
| 2020/0344248 A1 | 10/2020 | De Jesus | |
| 2020/0401702 A1* | 12/2020 | Karabatis | G06F 8/75 |
| 2021/0155136 A1* | 5/2021 | Kim | B60N 2/0244 |
| 2021/0182403 A1* | 6/2021 | Shackleton | G06N 20/00 |
| 2021/0182404 A1* | 6/2021 | Shackleton | G06F 18/214 |
| 2021/0200840 A1* | 7/2021 | Kannan | G06F 8/73 |

OTHER PUBLICATIONS

U.S. Appl. No. 17/122,681, filed Dec. 15, 2020, naming inventors McDonald et al.

U.S. Appl. No. 17/122,765, filed Dec. 15, 2020, naming inventors McDonald et al.

\* cited by examiner

US 12,141,289 B1

REAL TIME APPLICATION PROTECTION SYSTEM CONFIGURATION DEFICIENCY PREDICTION

This application claims the benefit of U.S. Provisional Application No. 62/972,280, filed Feb. 10, 2020, the entire contents of which is incorporated herein by reference.

TECHNICAL FIELD

This disclosure relates to computer systems and, in particular, application security for computer systems.

BACKGROUND

Web applications are client-server computer programs in which client-side operations and user interface(s) run on a web browser. The server-side operations of web applications may be implemented by a computer network including a number of servers and computing devices. For example, a web application running on a server, accessed via a web browser, may communicate, via the Internet, with a database server of a computer network to access files or other information. In some instances, one or more real-time application protection systems may be deployed to monitor network data and identify data that may be malicious based on one or more configurations. For example, a web application firewall (WAF) system may filter, monitor, and block malicious data to and from a web application based on one or more configurations of the WAF. Similarly, a runtime application self-protection (RASP) system detects and reports or blocks malicious data based on one or more configurations of the RASP and runtime information of the web application. WAF or RASP systems may be commercial off-the-shelf systems that can be interacted with via one or more application programming interfaces (APIs). Configurations for one or more real-time application protection systems may be changed over time from the baseline configurations, which may leave the web applications vulnerable to potential network attacks.

SUMMARY

In general, this disclosure describes computer systems for improving real-time application protection (RTAP) systems (e.g., web application firewalls (WAFs), runtime application self-protection (RASP) systems, and the like). RTAP systems may be commercial off-the-shelf systems that can be interacted with via one or more application programming interfaces (APIs).

In one example, a device within a trusted network may train one or more machine learning (ML) models to detect vulnerabilities within a configuration based on a plurality of configurations (e.g., the configurations for the RTAP systems and/or baseline configurations), a plurality of known vulnerabilities (e.g., from the defect data store), and/or a plurality of log files of the RTAP systems. The device may then apply the one or more ML models to a proposed configuration for an RTAP system to predict one or more potential vulnerabilities. In some examples, the device may identify one or more changes to the proposed configuration to overcome the predicated one or more potential vulnerabilities. In this way, the device may strengthen proposed configuration stings for an RTAP system before it is deployed.

In another example, this disclosure is directed to a computer-implemented method including training one or more machine learning models with a first plurality of configuration settings of application protection systems corresponding to a plurality of applications and a first plurality of known vulnerabilities corresponding the first plurality of configuration settings; applying the one or more machine learning models to a proposed configuration setting to predict one or more potential vulnerabilities of the proposed configuration setting; and identifying one or more configuration changes to the proposed configuration setting to overcome the predicted one or more potential vulnerabilities.

In another example, this disclosure is directed to a computer-readable medium storing instructions that, when executed by a computing system, cause one or more processors of the computing system to: train one or more machine learning models with a first plurality of configuration settings of application protection systems corresponding to a plurality of applications and a first plurality of known vulnerabilities corresponding the first plurality of configuration settings; apply the one or more machine learning models to a proposed configuration setting to predict one or more potential vulnerabilities of the proposed configuration setting; and identify one or more configuration changes to the proposed configuration setting to overcome the predicted one or more potential vulnerabilities.

The details of one or more examples are set forth in the accompanying drawings and the description below. Other features, objects, and advantages will be apparent from the description and drawings, and from the claims.

DETAILED DESCRIPTION

Figure 1:
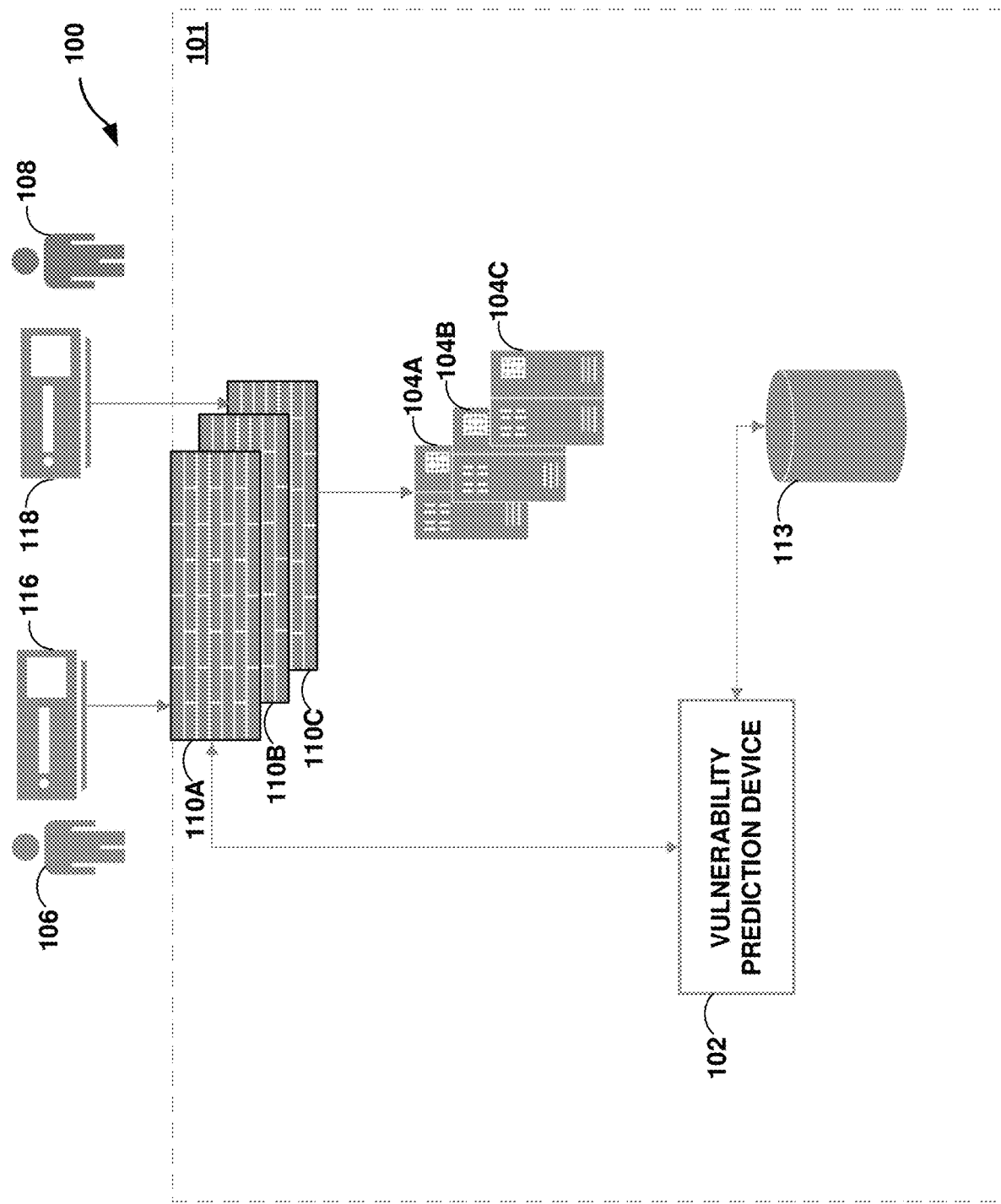
FIG. 1 is a block diagram illustrating an example computing system configured to predict vulnerabilities of proposed configurations for real-time application protection systems according to the techniques of this disclosure.

FIG. 1 is a block diagram illustrating an example computing system 100 configured to predict vulnerabilities of proposed configurations for real-time application protection (RTAP) systems 110A-110C (collectively, "RTAP systems 110") according to the techniques of this disclosure. RTAP systems 110 may include web application firewalls (WAFs), runtime application self-protection (RASP) systems, and the like). RTAP systems 110 may be commercial off-the-shelf systems that can by interacted with via one or more application programming interfaces (APIs). For example, RTAP systems 110 may be configured or deployed through one or more APIs. Additionally, information from RTAP system 110 may be obtained through one or more APIs. In some examples, RTAP systems 110 may include deployed agents that may interacted with through a centralized server using an API.

In particular, system 100 includes a trusted network 101 that hosts web applications 104A-104C (collectively, "applications 104"). Trusted network 101 may be a computer network (e.g., a wide area network (WAN), such as the Internet, a local area network (LAN), or a virtual private network (VPN)), a telephone network (e.g., the PSTN or a wireless network), or another wired or wireless communication network. Although illustrated as a single entity, trusted network 101 may comprise a combination of multiple networks. Trusted network 101 also includes RTAP systems 110 that monitor network data into and out of applications 104 to identify data that may be malicious based on one or more configurations of the RTAP systems 110. In some examples, RTAP system 110A may correspond (e.g., monitor) application 104A, RTAP system 110B may correspond application 104B, and RTAP system 110C may correspond application 104C. For example, a computing device 116 operated by a user 106 may interact with application 104A (e.g., submit and obtain data from the application) while RTAP system 110A monitors the data traffic between the computing device 116 and application 104A. While three RTAP systems 110 and three applications 104 are shown in FIG. 1, system 100 may contain fewer or more RTAP systems 110 or applications 104. In another example, a computing device 118 operated by a malicious user 108 may attempt to submit malicious data or obtain data for which they are not authorized from application 104C (e.g., a denial of service attack, malicious HTTP POST/GET request, port scanning, a brute force attack) and RTAP system 110C may identify this malicious network traffic and block, report, and/or log it.

In some examples, computing device 116 and/or computing device 118 may be any suitable communication or computing device, such as a conventional or a mobile, non-mobile, wearable, and/or non-wearable computing device capable of communicating over network 18. For example, each of computing device 116, 118 may include any one or a combination of a conventional mobile phone, a smart phone, a smart watch, a tablet computer, a personal digital or virtual assistant, a gaming system, a media player, a smart television, an Internet of Things (IoT) device, an automobile or other vehicle, a laptop or notebook computer, a desktop computer, or any other type of wearable, non-wearable, mobile, and non-mobile computing device that may perform operations in accordance with one or more aspects of the present disclosure. One or more of computing device 116, 118 may support communication services over packet-switched networks, e.g., the public Internet, including Voice over Internet Protocol (VOIP).

In some examples, system 100 may store defect information in defect data store 113. For example, system 100 may store known defects, vulnerabilities, and/or attack signatures in defect data store 113. In some examples defect data store 113 may be a database, server, or any other computing system with storage. In some examples, one or more attack signatures stored in defect data store 113 may be received from third party, may correspond to a previously received attack by trusted network 101, or may be associated with known defects of any of RTAP systems 110.

In some examples, system 100 may include a vulnerability prediction device 102 configured to predict vulnerabilities of potential configurations for RTAP systems 104. In general, vulnerability prediction device 102 may comprise one or more computing devices, including servers, laptop or notebook computers, desktop computers, or any other type of computing devices that may perform operations in accordance with one or more aspects of the present disclosure.

In some examples, vulnerability prediction device 102 may store information about one or more baseline configurations for each of RTAP systems 110. For example, one or more remote devices or vulnerability prediction device 102 may store first baseline configuration settings for RTAP system 110A, second baseline configuration settings for RTAP system 110B, and third baseline configuration settings for RTAP system 110C. In some examples, first, second, and third baseline configuration settings may be the same or different. Baseline configuration settings may be configuration settings that have been tested and/or approved for deployment for RTAP systems 110 that include protections against a plurality of known potential attacks. In some examples, vulnerability prediction device 102 may store baseline configurations in local memory or in remote memory (e.g., on a server, database, or another device).

In some examples, vulnerability prediction device 102 may train one or more machine learning (ML) models using training data sets of existing configuration files or sections of configuration files that are labeled as being vulnerable to certain defects. The existing configuration files may include the baseline configurations, current configurations of RTAP systems 110, and/or any other configurations of RTAP systems, including previous configurations of RTAP systems 110 or other RTAP systems. The vulnerabilities identified in the training data sets used by vulnerability prediction device 102 to train the one or more ML models may be based on a plurality of known vulnerabilities (e.g., attack signatures from defect data store 113). In other examples, the vulnerabilities identified in the training data sets used by vulnerability prediction device 102 to train the one or more ML models may be based on a plurality of system logs from RTAP systems 110. For example, the plurality of in system logs may include data corresponding to one or more previous attacks (e.g., attack payloads, attack signatures, or any other information about previous attacks). In this way, vulnerability prediction device 102 may generate multiple different ML models, each ML model trained to predict whether configuration data in a specific type of configuration file or a specific section of a configuration file is vulnerable to a specific type of defect.

Vulnerability prediction device 102 may apply those ML models to a proposed configuration setting of RTAP systems 110 to predict potential vulnerabilities of the proposed configuration setting. As described above, vulnerability prediction device 102 may generate specific ML models correlated to specific types of defects to predict vulnerability in configuration settings. Each of the ML models may take an XML configuration file of the proposed configuration as input, and output a prediction of whether the configuration file and/or a specific section of the configuration file of the proposed configuration is affected by the corresponding particular vulnerability. By applying the one or more ML models, vulnerability prediction device 102 may identify one or more potential vulnerabilities of the proposed configuration setting of RTAP systems 110 and may identify specific sections or locations within the proposed configuration setting affected by the one or more potential vulnerabilities.

In some examples, vulnerability prediction device 102 may segment the proposed configuration of RTAP systems 110 into a plurality of sections based on the types of vulnerabilities that may occur in each of the sections. Vulnerability prediction device 102 may apply an ML model correlated to each section of the plurality of sections. Examples of sections of the configuration file may include signature section, policy version section, web scraping section, blocking section, whitelist section, etc. For example, the correlated ML model may take XML configuration files of a section of the proposed configuration of RTAP systems 110 as input and output a prediction of whether the section of the proposed configuration is affected by the corresponding vulnerabilities of the section. By applying the correlated ML model to each section of the plurality of sections, vulnerability prediction device 102 may identify one or more vulnerabilities of each section of the plurality of sections. Vulnerability prediction device 102 may further combine the one or more vulnerabilities of each section of the plurality of sections to generate a list of potential vulnerabilities of the proposed configuration setting of RTAP systems 110. In some other examples, the one or more ML models may be combined into a single ML model, and vulnerability prediction device 102 may apply the combined ML model to the proposed configuration setting of RTAP systems 110 to predict potential vulnerabilities of proposed configuration setting.

If vulnerability prediction device 102 predicts any potential vulnerabilities of the proposed configurations, vulnerability prediction device 102 will generate an alert identifying the predicted potential vulnerabilities. In some examples, vulnerability prediction device 102 may transmit that alert to a device, such as a security monitoring device or any suitable computing device. In some examples, the alert may indicate to focus testing of the proposed configuration based on the predicted potential vulnerabilities. For example, vulnerability prediction device 102 may provide an alert to a user that prompts the user to run one or more tests for predicted potential vulnerabilities. In some examples, vulnerability prediction device 102 may automatically execute an instruction to run one or more tests for the predicted potential vulnerabilities. In some examples, vulnerability prediction device 102 may identify one or more configuration setting changes to the proposed configuration to overcome predicted potential vulnerabilities.

In some examples, the alert may be communicated from vulnerability prediction device 102 to other devices in the form of application-based alerts, email messages, text messages, or any other electronic communication. For example, an alert may be communicated in an email message, such as an emailed document or an emailed link. In some examples, the alert may be transmitted in XML format. As such, the disclosed techniques may enable a user to quickly and easily identify one or more potential vulnerabilities of the RTAP systems 110.

Figure 2:
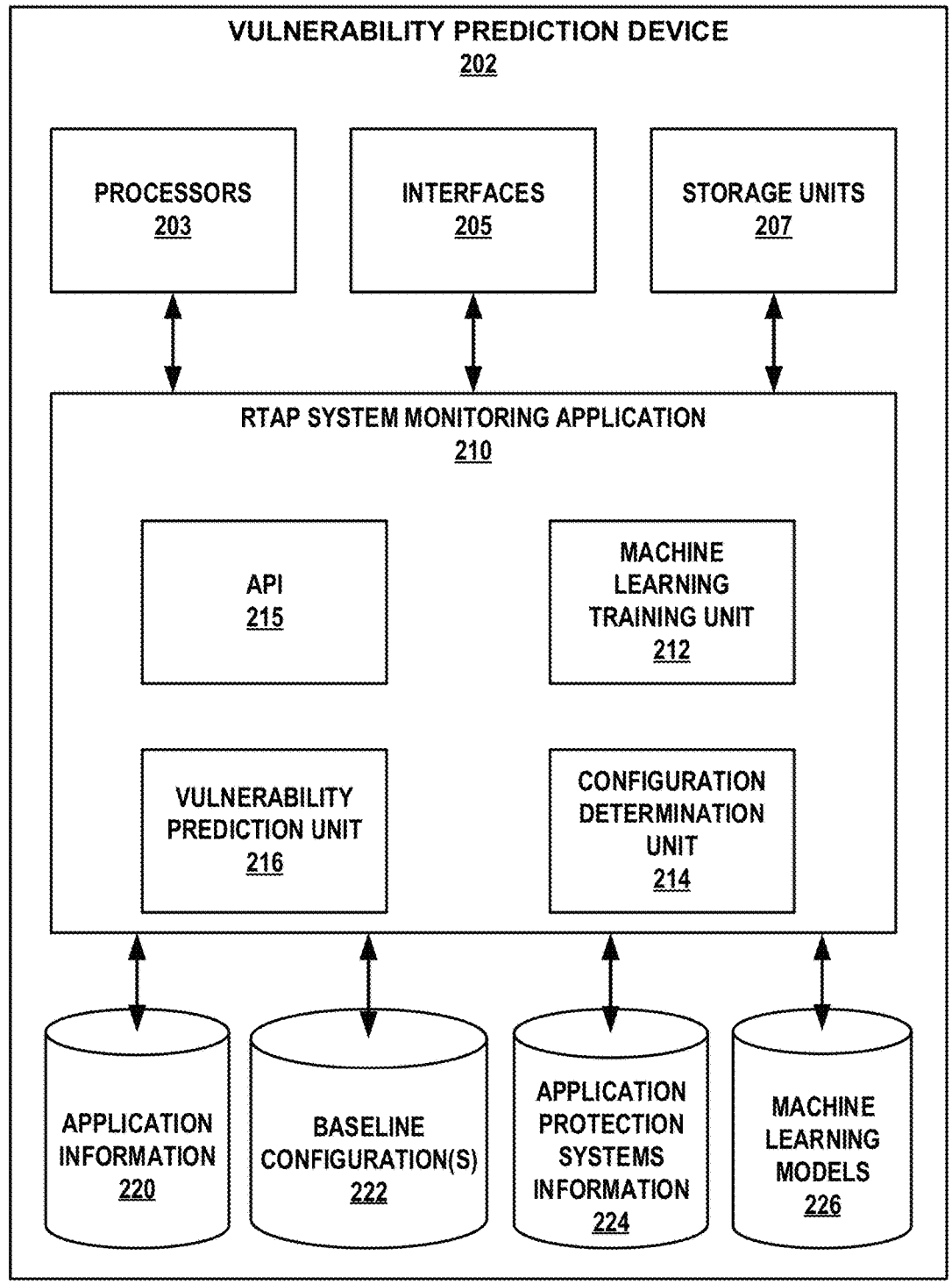
FIG. 2 is a block diagram illustrating an example set of components of a device configured to perform the techniques of this disclosure.

FIG. 2 is a block diagram illustrating an example set of components of vulnerability prediction device 202, which may be configured to perform the techniques of this disclosure. In the example of FIG. 2, vulnerability prediction device 202 includes processors 203, interfaces 205, storage units 207, RTAP system monitoring application 210, application information 220, baseline configurations 222, RTAP systems information 224, and machine learning (ML) models 226. RTAP system monitoring application 210 further includes application programming interface (API) 215, machine learning (ML) training unit 212, configuration determination unit 214, and vulnerability prediction unit 216. The components, units or modules of vulnerability prediction device 202 are coupled (physically, communicatively, and/or operatively) using communication channels for inter-component communications. In some examples, the communication channels may include a system bus, a network connection, an inter-process communication data structure, or any other method for communicating data.

Processors 203, in one example, may comprise one or more processors that are configured to implement functionality and/or process instructions for execution within vulnerability prediction device 202. For example, processors 203 may be capable of processing instructions stored by storage units 207. Processors 203 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Storage units 207 of vulnerability prediction device 202 may store an operating system (not shown) executable by processors 203 to control the operation of components of vulnerability prediction device 202. Storage units 207 may also be configured to store information within vulnerability prediction device 202 during operation. Storage units 207 may include a computer-readable storage medium or computer-readable storage device. In some examples, storage units 207 include one or more of a short-term memory or a long-term memory. Storage units 207 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage units 207 are used to store program instructions for execution by processors 203. Storage units 207 may be used by software or applications running on vulnerability prediction device 202 (e.g., RTAP system monitoring application 210) to temporarily store information during program execution.

Vulnerability prediction device 202 further includes RTAP system monitoring application 210, which may include API 215. Vulnerability prediction device 202 may utilize interfaces 205 or API 215 to communicate with other systems or devices via one or more networks, e.g., RTAP systems 110 and/or defect data store 113 of FIG. 1. Interfaces 205 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, RTAP system monitoring application 210 utilizes interfaces 205 to wirelessly communicate with RTAP systems 110, applications 104 from FIG. 1. Although illustrated in FIG. 2 as including a single API 215, in other examples, RTAP system monitoring application 210 may include a plurality of APIs to pull data from one or more remote devices and/or interact with any of the other systems within trusted network 101 of FIG. 1.

RTAP system monitoring application 210 may predict vulnerabilities of proposed configurations for RTAP systems 110 using one or more of machine learning (ML) models 226. In general, a computing system uses a machine-learning algorithm to build a model based on a set of training data such that the model "learns" how to make predictions, inferences, or decisions to perform a specific task without being explicitly programmed to perform the specific task. Once trained, the computing system applies or executes the trained model to perform the specific task based on new data. Examples of machine-learning algorithms and/or computer frameworks for machine-learning algorithms used to build the models include a linear-regression algorithm, a logistic-regression algorithm, a decision-tree algorithm, a support vector machine (SVM) algorithm, a k-Nearest-Neighbors (kNN) algorithm, a gradient-boosting algorithm, a random-forest algorithm, or an artificial neural network (ANN), such as a convolutional neural network (CNN). For example, a gradient-boosting model may comprise a series of trees where each subsequent tree minimizes a predictive error of the preceding tree.

Returning to the example of FIG. 2, RTAP system monitoring application 210 includes ML training unit 212, configuration determination unit 214, and vulnerability prediction unit 216.

Each of ML models 226 may include a function (e.g., a machine learning algorithm) configured to be executed by processors 203. The function may include nodes, layers, and connections, and the function may be represented by equations having a plurality of variables and a plurality of known coefficients. ML training 212 is configured to train the machine learning algorithms of ML models 226 using training data and a training process to create the data-specific ML models 226. In accordance with the techniques of this disclosure, ML training unit 212 may train one or ML models 226 with the baseline configurations 222, current configurations of RTAP systems 110, and/or any other configurations of RTAP systems and any known vulnerabilities associated with those configurations (e.g., from defect data store 113 for FIG. 1). In some examples, ML training unit 212 may train the one or more ML models with a plurality of system logs from RTAP systems 110. For example, the plurality of system logs may include data corresponding to one or more previous attacks (e.g., attack payloads, attack signatures, or any other information about previous attacks).

Vulnerability prediction unit 216 may apply the trained ML models 226 to proposed configuration of RTAP systems 110 to predict potential vulnerabilities of the proposed configuration. If vulnerability prediction device 202 predicts any potential vulnerabilities of the proposed configurations, RTAP system monitoring application 210 will generate an alert identifying the predicted potential vulnerabilities. In some examples, vulnerability prediction device 202 may transmit, via interfaces 205 or API 215, that alert to a device, such as a security monitoring device or any suitable computing device. In some examples, the alert may indicate to focus testing of the proposed configuration based on the predicted potential vulnerabilities. In some examples, configuration determination unit 214 may identify one or more configuration setting changes to the proposed configuration to overcome predicted potential vulnerabilities. For example, configuration determination unit 214 may look up one or more attack signatures associated with the predicted potential vulnerabilities from defect data store 113 to retrieve one or more rules or configuration settings that are known to protected against the predicted potential vulnerabilities.

Figure 3:
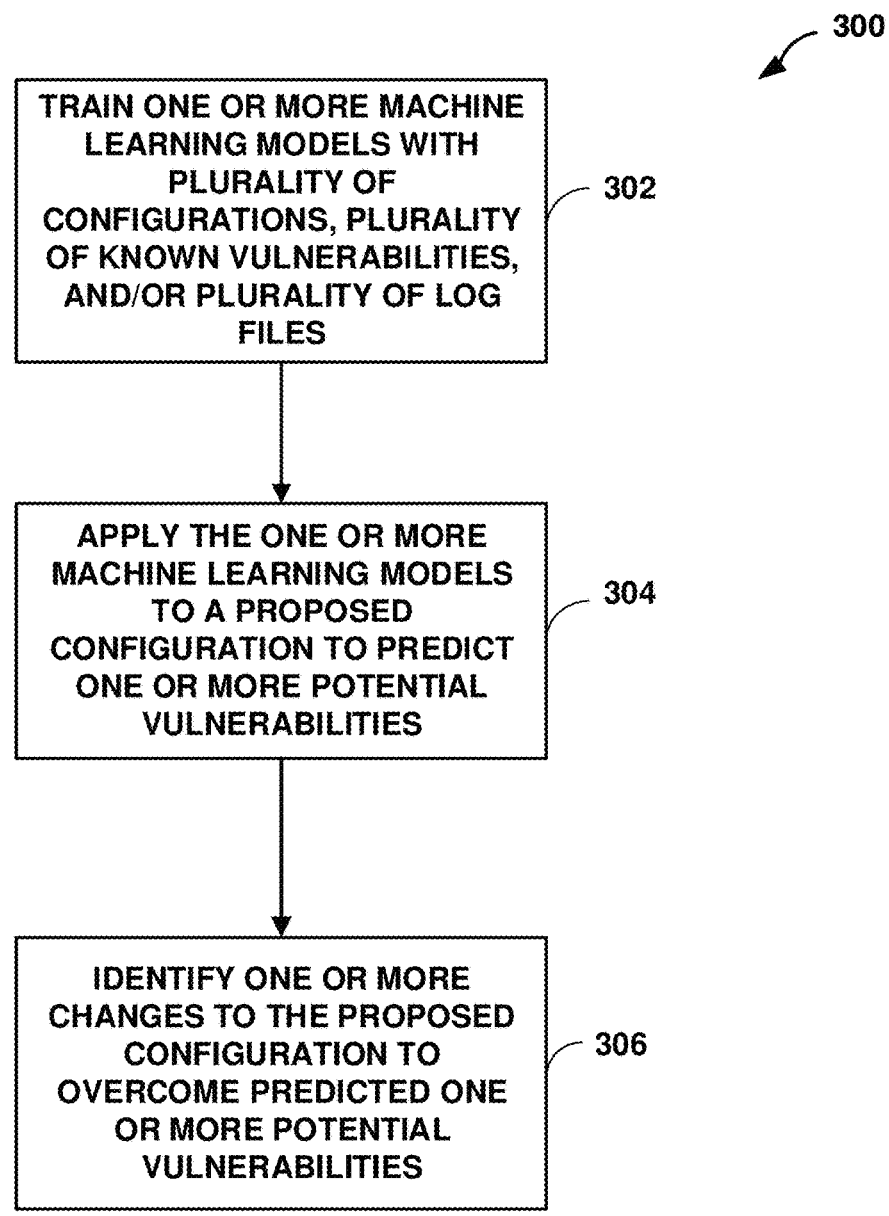
FIG. 3 is a flowchart illustrating an example method of predicting vulnerabilities of configurations for real-time application protection systems according to the techniques of this disclosure.

FIG. 3 is a flowchart 300 illustrating an example method of predicting vulnerabilities of configurations for real-time application protection systems according to the techniques of this disclosure. For purposes of example and explanation, the method of FIG. 3 is explained with respect to vulnerability prediction device 202 of FIG. 2. However, it should be understood that other computer devices may be configured to perform this or a similar method, including any of vulnerability prediction devices 102 or 202 of FIGS. 1-2.

Vulnerability prediction device 202 may train one or more machine learning (ML) models with a plurality of configurations, a plurality of known vulnerabilities, and/or a plurality of log files to identify particular configuration settings with known vulnerabilities (302) For example, vulnerability prediction device 202 may train the one or more ML models with baseline configurations for RTAP systems, current configurations of RTAP systems (e.g., RTAP systems 110), and/or any other configurations of RTAP systems, including previous configurations of RTAP systems 110 or other RTAP systems, and any known vulnerabilities associated with those configurations (e.g., from defect data store 113). In another example, vulnerability prediction device 202 may train the one or more ML models with log files containing information about one or more successful attacks and the configuration settings of the RTAP system that failed to identify those successful attack. In this way, the ML models will be able to identify configuration setting patterns that are susceptible to particular vulnerabilities.

Device 204 may apply the ML models to proposed configuration settings of one or more RTAP systems to predict potential vulnerabilities of the proposed configuration settings (304). If vulnerability prediction device 202 predicts any potential vulnerabilities of the proposed configurations, vulnerability prediction device 202 may identify one or more configuration setting changes to the proposed configuration settings to overcome predicted potential vulnerabilities (308). In some examples, vulnerability prediction device 202 may generate an alert identifying the predicted potential vulnerabilities and/or the one or more configuration setting changes. In some examples, vulnerability prediction device 202 may transmit, via an interface or API, that alert to a device (e.g., a security monitoring device or any suitable computing device). In some examples, the alert may indicate to focus testing of the proposed configuration based on the predicted potential vulnerabilities.

The methods described above with respect to FIG. 3 may be performed by the same device (e.g., any of vulnerability prediction devices 102, 202, and/or any suitable device). Additionally, the components and functionality described above with respect to any of vulnerability prediction devices 102 and/or 202 may be combined into a single device that may implement all of the techniques of this disclosure.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A computer-implemented method comprising:
training a first machine learning model with a first configuration setting of application protection systems corresponding to a plurality of applications and a first plurality of known vulnerabilities corresponding to the first configuration setting;
training a second machine learning model with a second configuration setting of application protection systems corresponding to the plurality of applications and a second plurality of known vulnerabilities corresponding to the second configuration setting;
applying each of the first machine learning model and the second machine learning model to a proposed configuration setting to predict one or more potential vulnerabilities of the proposed configuration setting;
wherein applying each of the first machine learning model and the second machine learning model to a proposed configuration setting to predict one or more potential vulnerabilities of the proposed configuration setting comprises:
segmenting the proposed configuration setting into a plurality of sections;
applying each of the first machine learning model and the second machine learning model to each section of the plurality of sections;
predicting, for each section of the plurality of sections, a respective set of potential vulnerabilities;
generating a list of the one or more potential vulnerabilities of the proposed configuration setting based on the respective set of potential vulnerabilities for each section of the plurality of sections of the proposed configuration setting;
identifying one or more configuration changes to the proposed configuration setting to overcome the predicted one or more potential vulnerabilities; and
generating and providing an alert to a user identifying the predicted one or more potential vulnerabilities, wherein the alert includes a section by section list of the plurality of sections, the respective set of potential vulnerabilities from the list of one or more potential vulnerabilities for each of the plurality of sections, and an indication to focus testing of the proposed configuration setting based on the predicted one or more potential vulnerabilities.

2. The method of claim 1, further comprising:
training each of the first machine learning model and the second machine learning model with a plurality of system logs of the application protection systems, the plurality of system logs including data corresponding to one or more attacks.

3. The method of claim 1, further comprising:
transmitting the alert to a secondary device of the user.

4. The method of claim 1, further comprising:
testing the proposed configuration setting based on the predicted one or more potential vulnerabilities.

5. The method of claim 1, wherein training each of the first machine learning model and the second machine learning model comprises training each of the first machine learning model and the second machine learning model to predict whether configuration data in a respective type of configuration file or a respective section of a configuration file is affected by a respective type of vulnerability of the plurality of known vulnerabilities.

6. The method of claim 5, wherein applying each of the first machine learning model and the second machine learning model to a proposed configuration setting to predict one or more potential vulnerabilities of the proposed configuration setting comprises:
applying a respective machine learning model correlated to the respective type of vulnerability to the proposed configuration setting, wherein the respective machine learning model is configured to receive a configuration file of the proposed configuration setting as an input and is configured to output a prediction of whether the configuration file or a section of the configuration file is affected by the respective type of vulnerability.

7. The method of claim 1, further comprising:
based on generating the alert including the indication, automatically executing an instruction to run one or more tests for the predicted one or more potential vulnerabilities on the proposed configuration setting.

8. The method of claim 1, further comprising:
receiving a request from the user to run one or more tests for the predicted one or more potential vulnerabilities in accordance with the indication included in the alert; and
based on the request, executing an instruction to run the one or more tests for the predicted one or more potential vulnerabilities on the proposed configuration setting.

9. A device comprising:
a memory; and
one or more processors in communication with the memory, the one or more processors configured to:
train a first machine learning model with a first plurality of configuration setting of application protection systems corresponding to a plurality of applications and a first plurality of known vulnerabilities corresponding to the first configuration setting;
train a second machine learning model with a second configuration setting of application protection systems corresponding to the plurality of applications and a second plurality of known vulnerabilities corresponding to the second configuration setting;
apply each of the first machine learning model and the second machine learning model to a proposed configuration setting to predict one or more potential vulnerabilities of the proposed configuration setting;
wherein applying each of the first machine learning model and the second machine learning model to a proposed configuration setting to predict one or more potential vulnerabilities of the proposed configuration setting comprises:
segmenting the proposed configuration setting into a plurality of sections;

applying each of the first machine learning model and the second-machine learning model to each section of the plurality of sections;

predicting, for each section of the plurality of sections, a respective set of potential vulnerabilities;

generating a list of the one or more potential vulnerabilities of the proposed configuration setting based on the respective set of potential vulnerabilities for each section of the plurality of sections of the proposed configuration setting;

identify one or more configuration changes to the proposed configuration setting to overcome the predicted one or more potential vulnerabilities; and generate and provide an alert to a user identifying the predicted one or more potential vulnerabilities, wherein the alert includes a section by section list of the plurality of sections, the respective set of potential vulnerabilities from the list of one or more potential vulnerabilities for each of the plurality of sections, and an indication to focus testing of the proposed configuration setting based on the predicted one or more potential vulnerabilities.

10. The device of claim 9, wherein the one or more processors are further configured to:

train each of the first machine learning model and the second machine learning model with a plurality of system logs of the application protection systems, the plurality of system logs including data corresponding to one or more attacks.

11. The device of claim 9, wherein the one or more processors are further configured to:

transmit the alert from the device to a secondary device of the user.

12. The device of claim 9, wherein the one or more processors are further configured to:

test the proposed configuration setting based on the predicted one or more potential vulnerabilities.

13. The device of claim 9, wherein the one or more processors are further configured to:

train each of the first machine learning model and the second machine learning model to predict whether configuration data in a respective type of configuration file or a respective section of a configuration file is affected by a respective type of vulnerability of the plurality of known vulnerabilities.

14. The device of claim 13, wherein the one or more processors are further configured to:

apply a respective machine learning model correlated to the respective type of vulnerability to the proposed configuration setting, wherein the respective machine learning model is configured to receive a configuration file of the proposed configuration setting as an input and is configured to output a prediction of whether the configuration file or a section of the configuration file is affected by the respective type of vulnerability.

15. A non-transitory computer-readable medium storing instructions that, when executed by a computing system, cause one or more processors of the computing system to:

train a first machine learning model with a first plurality of configuration settings of application protection systems corresponding to a plurality of applications and a first plurality of known vulnerabilities corresponding to the first configuration setting;

train a second machine learning model with a second configuration setting of application protection systems corresponding to the plurality of applications and a second plurality of known vulnerabilities corresponding to the second configuration setting;

apply the each of the first machine learning model and the second machine learning model to a proposed configuration setting to predict one or more potential vulnerabilities of the proposed configuration setting;

wherein applying each of the first machine learning model and the second machine learning model to a proposed configuration setting to predict one or more potential vulnerabilities of the proposed configuration setting comprises:

segmenting the proposed configuration setting into a plurality of sections;

applying the each of the first machine learning model and the second machine learning model to each section of the plurality of sections;

predicting, for each section of the plurality of sections, a respective set of potential vulnerabilities;

generating a list of the one or more potential vulnerabilities of the proposed configuration setting based on the respective set of potential vulnerabilities for each section of the plurality of sections of the proposed configuration setting;

identify one or more configuration changes to the proposed configuration setting to overcome the predicted one or more potential vulnerabilities; and generate and provide an alert to a user identifying the predicted one or more potential vulnerabilities, wherein the alert includes a section by section list of the plurality of sections, the respective set of potential vulnerabilities from the list of one or more potential vulnerabilities for each of the plurality of sections, an indication to focus testing of the proposed configuration setting based on the predicted one or more potential vulnerabilities.

16. The non-transitory computer-readable medium of claim 15, further comprising instructions that, when executed by the computing system, cause the one or more processors of the computing system to:

train each of the first machine learning model and the second machine learning model with a plurality of system logs of the application protection systems, the plurality of system logs including data corresponding to one or more attacks.

17. The non-transitory computer-readable medium of claim 15, further comprising instructions that, when executed by the computing system, cause the one or more processors of the computing system to:

transmit the alert from the computing system to a secondary computing device of the user.

* * * * *